United States Patent [19]

Hauxwell et al.

[11] 4,163,749

[45] Aug. 7, 1979

[54] DISPERSING AGENTS

[75] Inventors: Frank Hauxwell; James F. Stansfield; Arthur Topham, all of Manchester, England

[73] Assignee: Imperial Chemical Industries Limited, London, United Kingdom

[21] Appl. No.: 526,918

[22] Filed: Nov. 25, 1974

Related U.S. Application Data

[63] Continuation-in-part of Ser. No. 330,882, Feb. 8, 1973, abandoned.

[30] Foreign Application Priority Data

Feb. 28, 1972 [GB] United Kingdom ............... 9033/72

[51] Int. Cl.$^2$ ............................................. B01F 17/28
[52] U.S. Cl. ........................... 260/404.5; 106/308 N; 260/553 A; 560/26; 560/158
[58] Field of Search ............... 260/404.5, 404.5 R, 260/404.5 I, 471 C, 482 B, 553 A; 106/308 N; 560/26, 158

[56] References Cited

U.S. PATENT DOCUMENTS

| | | | |
|---|---|---|---|
| 2,882,249 | 4/1959 | Posnansky | 260/404.5 X |
| 3,022,326 | 2/1962 | Schroeder et al. | 260/404.5 |
| 3,022,327 | 2/1962 | Waythomas | 260/404.5 |
| 3,037,947 | 6/1962 | Elkin | 260/404.5 X |
| 3,045,034 | 7/1962 | Zankl et al. | 260/404.5 |
| 3,183,112 | 5/1965 | Gemasser | 260/404.5 X |
| 3,345,311 | 10/1967 | Ehrlich et al. | 260/404.5 X |
| 3,483,150 | 12/1969 | Ehrlich et al. | 260/404.5 X |
| 3,560,235 | 2/1971 | Sarfas | 106/308 N |
| 3,655,608 | 4/1972 | Guenther et al. | 106/308 N |
| 3,723,151 | 3/1973 | Backhouse et al. | 106/308 N |
| 3,728,301 | 4/1973 | Spence et al. | 106/308 N |

FOREIGN PATENT DOCUMENTS 1147732  4/1969 United Kingdom .
1162722  8/1969 United Kingdom .

*Primary Examiner*—L. Dewayne Rutledge
*Assistant Examiner*—John P. Sheehan
*Attorney, Agent, or Firm*—Cushman, Darby & Cushman

[57] ABSTRACT

Dispersing agents comprising the adducts of one or more compounds from each of the following classes:
(a) an organic compound containing two or more isocyanate groups,
(b) an organic compound containing two or more groups which are reactive with isocyanate groups, and
(c) a compound of the formula:

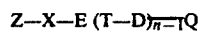

wherein
Z represents —OH or —NHR, wherein R is alkyl;
X is optionally substituted alkylene;
T is alkylene;
n is a positive integer;
Q is optionally substituted alkyl; and
E is a

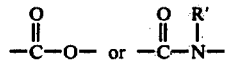

group wherein R' is hydrogen or alkyl, and D is a

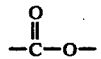

group provided that only one of E and D is connected to T via the carbon atom of the carbonyl group present in D and E, and at least one of the group represented by X, T, Q, R and R$^1$ contains a carbon chain having more than 4 carbon atoms, a process for the manufacture of the said dispersing agents, and their use in the preparation of finely divided dispersions of solids in organic liquids.

6 Claims, No Drawings

DISPERSING AGENTS

This application is a continuation-in-part of our application Ser. No. 330882 which was filed in the United States Patent Office on Feb. 8, 1970, now abandoned.

According to the invention there are provided the adducts of one or more compounds from each of the following classes:

(a) an organic compound containing two or more isocyanate groups,
(b) an organic compound containing two or more groups which are reactive with isocyanate groups, and
(c) a compound of the formula:

$$Z-X-E-(T-D)_{n-1}Q$$

wherein
Z represents —OH or —NHR, wherein R is a monovalent saturated hydrocarbon radical;
X is an optionally substituted divalent saturated hydrocarbon radical;
T is a divalent saturated hydrocarbon radical;
n is a positive integer;
Q is an optionally substituted monovalent saturated hydrocarbon radical; and E is a

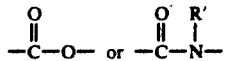

group wherein R' is a hydrogen atom or a monovalent saturated hydrocarbon radical, and D is a

group provided that only one of E and D is connected to T via the carbon atom of the carbonyl group present in D and E, and at least one of the group represented by X, T, Q, R and R' contains a carbon chain having at least five carbon atoms.

The optionally substituted divalent saturated hydrocarbon radical represented by X is preferably a divalent saturated aliphatic hydrocarbon radical or a halogeno substituted derivative thereof such as ethylene, trimethylene and (chloromethyl)ethylene, but more particularly X is a divalent saturated aliphatic radical having a chain of at least 10 carbon atoms which contains a terminal —CH$_2$— group through which X is connected to E, such as

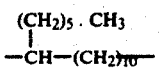

Preferably X is connected to the carbon atom of the carbonyl group present in E via a terminal —CH$_2$— group in the divalent saturated hydrocarbon radical.

The divalent saturated hydrocarbon radical represented by T is preferably a divalent saturated by hydrocarbon radical such as ethylene or trimethylene, but more particularly such a radical having a chain of at least 10 carbon atoms, for example a radical of the formula:

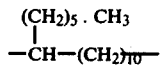

Preferably T is connected to the carbon atom of the carbonyl group present in D or E through a terminal —CH$_2$— group in the divalent saturated hydrocarbon radical.

The monovalent saturated hydrocarbon radicals represented by R and R' are preferably alkyl radicals such as the ethyl radical, but more especially alkyl radicals containing at least 8 carbon atoms such as octyl, decyl, dodecyl, hexadecyl and octadecyl.

Preferably n is an integer not exceeding 8, and, above all, n is 1.

The optionally substituted monovalent saturated hydrocarbon radicals represented by Q are preferably optionally substituted monovalent saturated aliphatic radicals in particular optionally substituted alkyl radicals such as ethyl, β-butoxyethyl and 11-hydroxyheptadecyl. It is however preferred that Q is an unsubstituted alkyl radical in particular such radicals containing at least 12 carbon atoms such as dodecyl, hexadecyl, heptadecyl and octadecyl.

The compound (c) contains at least one chain having at least 5 carbon atoms, and preferably it contains two or more such chains; in particular it is preferred that such chains contain ten or more carbon atoms.

The organic compound (b) which contains two or more groups which are reactive with isocyanate groups is preferably an organic compound which contains two or more hydroxy and/or primary or secondary amino groups which are reactive with isocyanate groups.

Suitably compound (c) is of the formula:

$$Z-X^1-E-Q^1$$

wherein Z and E are as defined, $X^1$ is alkylene having a chain of at least 10 carbon atoms which contains a terminal —CH$_2$— group through which $X^1$ is connected to E, abd $Q^1$ is alkyl containing at least 12 carbon atoms.

Suitable dispersing agents also include adducts of an 80:20 mixture of 2:4 and 2:6 diisocyanato toluene, an aliphatic diol containing at least 5 carbon atoms and a compound of the formula:

$$Z-X^1-E-Q^1$$

wherein
Z and E are as defined,
$X^1$ is alkylene or halogeno alkylene having a chain of at least 10 carbon atoms and joined to E through a terminal —CH$_2$— group containing in $X^1$, and
$Q^1$ is alkyl containing at least 12 carbon atoms.

According to a further feature of the invention there is provided a process for the manufacture of the said dispersing agents which comprises reacting together (a) an organic compound containing two or more isocyanate groups, (b) an organic compound containing two or more groups which are reactive with isocyanate groups, and (c) a compound of the formula:

$$Z-X-E-(T-D)_{n-1}Q$$

wherein Z, X, E, T, D, Q and n have the meanings stated.

In carrying out this reaction instead of using a single compound from each of the three classes (a), (b) and (c), mixtures of two or more compounds from one or more of these classes can in fact be used.

The reaction products of (a), (b), and (c) contain urethane, urea, allophanate and/or biuret groups these being formed by reaction of the isocyanate groups present in (a) with the hydroxy and/or amino groups present in (b) and (c). The compound containing the isocyanate groups (a) can be reacted simultaneously with the compounds (b) and (c), or the compound (a) can be reacted with (b), compound (c) added and the reaction completed. It is however preferred to react compound (a) with compound (c) and then to react with compound (b) using an amount of compound (b) which is at least equivalent to the free isocyanate groups present in the initial adduct of (a) and (c). If the final adduct of (a), (b) and (c) still contains free isocyanate groups then these are preferably destroyed by reaction with a monoalcohol such as methanol or a mono-amine such as ethylamine.

In carrying out the reaction it is preferred to use from 1 to 10, and especially from 1½ to 3, molecules of the polyisocyanate for each molecule of compound (c); the usage of compound (b) then corresponding at least to the free isocyanate groups present in the initial reaction product of (a) and (c). The reaction is preferably carried out in the presence of a catalyst for isocyanate reactions, such as diazabicyclooctane.

The reaction can be conveniently carried out in the presence of an inert organic solvent, such as acetone or a hydrocarbon liquid such as a petroleum fraction, the reaction preferably being carried out at a temperature between 40° C. and the boiling point of the reaction medium. At the conclusion of the reaction the inert organic solvent can be removed in conventional manner, for example by distillation, but if desired the resulting solution of the adduct in the inert organic solvent can be used directly in the preparation of dispersions.

The compounds (a) may be any aliphatic or cycloaliphatic compounds containing two or more isocyanate groups such as hexamethylene diisocyanate and isophorone diisocyanate, but are preferably aromatic polyisocyanates such as 4:4'-diisocyanatodiphenylmethane, 2:4-diisocyanatotoluene and 2:6-diisocyanatotoluene, and especially commercially available 80:20 mixtures of 2:4- and 2:6-diisocyanatotoluene.

The compounds (b) which contain two or more groups which react with isocyanate groups are preferably organic compounds which contain at least two hydroxy and/or primary or secondary amino groups. Such compounds include trimethylolpropane, diethanolamine and triethanolamine, but the preferred compounds are those containing two such groups. Such compounds include aliphatic diols for example ethylene glycol, propylene glycol, butane 1:3- or 1:4- diol, 1:5-pentanediol, 1:6-hexanediol and 1:10-decanediol Other compounds of this preferred class include aliphatic diamines such as ethylenediamine, 1.3-propylenediamine, hexamethylenediamine and commercially available amines of the formula VNH(CH$_2$)$_3$NH$_2$ where V is a long chain fatty radical, such as that derived from tallow. Other compounds include aminoalcohols duch as ethanolamine and β-hexadecylaminoethanol, diols containing ether groups such as diethyleneglycol, triethyleneglycol, polyethyleneglycol and dipropyleneglycol, and adducts of ethylene oxide with aliphatic primary amines, for example an adduct of two molecular proportions of ethylene oxide with one molecular proportion of a fatty amine derived from coconut oil which is commercially available as Ethomeen C/12 (RTM). Preferred compounds (b) are aliphatic diols containing at least 5 carbon atoms and especially polymethylene glycols containing from 5 to 10 carbon atoms.

The compounds (c) wherein Z is hydroxy, E is

can be obtained by polycondensation of a hydroxyacid, such as hydroxystearic acid, in the presence of an alcohol of the formula Q—OH.

The compounds (c) wherein Z is hydroxy, E is

and n is 1 can be obtained by esterifying a hydroxyacid such as hydroxystearic acid, with an alcohol Q—OH.

The compounds (c) wherein E is

can be made by heating an amine of the formula Z — X — NHR' with an acid of the formula

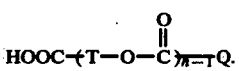

The compounds (c) wherein Z is hydroxy, X contains two carbon atoms between Z and E, E is

can be obtained by heating an acid of the formula:

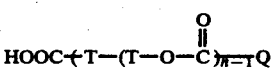

with the appropriate epoxy compound in the presence of a basic catalyst.

The compounds (c) wherein Z is hydroxy, E is

and n is 1 can be obtained by heating a hydroxyacid of the formula: HO — X — COOH with an amine of the formula

The compounds c) wherein Z is —NHR, E is

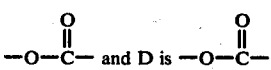

can be obtained by heating the hydrochloride of an amine of the formula RNH—X—OH with an acid chloride of the formula:

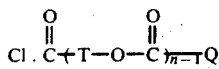

in the presence of p-toluenesulphonic acid and subsequently converting to the free amino compound.

In carrying out the above reactions which involve the formation of polyhydroxy esters an alkyl titanate is often used as a catalyst for the reaction. The presence of alkyl titanate in the resulting compounds can give rise to complications during the subsequent reactions with the polyisocyanate (a). Whilst the catalyst can be removed from the polyhydroxy esters this is frequently a complicated procedure which adds considerably to the cost of the final product. It has however been found that when using reactants (c) which contain alkyl titanates any undesirable side effects can be obviated by carrying out the condensation of (a), (b), and (c) in the presence of a small amount of acetylacetone and/or benzoyl chloride as an inhibitor for the alkyl titanate.

The adducts of the invention are of value as dispersing agents for preparing dispersions of solids, especially pigments of dyestuffs, in organic liquids, and are of particular value in the preparation of pigmentary dispersions of copper phthalocyanine, directly from crude copper phthalocyanine, such as are described and claimed in our co-pending Ser. No. 330,882, filed Feb. 8, 1973.

The invention is illustrated but not limited by the following Examples in which the parts and percentages are by weight:

In the Examples all references to tolylene diisocyante denote the commercially available mixture containing 80% of the 2:4- isomer and 20% of the 2:6- isomer. Unless otherwise stated the petroleum fraction is one boiling at 100° to 120° C.

Hydroxyester A

A mixture of 631 parts of a fatty alcohol containing 27% of hexadecanol and 73% of octadecanol, 685 parts of a commercial grade of 12-hydroxystearic acid (having acid and hydroxy values of 182 mg KOH/g and 160 mg KOH/g respectively) and 0.24 part of tetrabutyltitanate is heated for 5 hours at 190° to 200° C., the water formed in the reaction being removed by a stream of nitrogen. On cooling a wax is obtained. This has an acid value of 0.23 mg KOH/g.

Hydroxyester B

A mixture of 270 parts of a commercially available straight chain primary fatty alcohol containing 6.9% hydroxy groups, 730 parts of a commercial grade of 12-hydroxystearic acid and 2 parts of tetrabutyl titanate is heated for 6 hours at 190° to 200° C., the water formed in the reaction being removed in a stream of nitrogen. On cooling a wax is obtained. This has an acid value of 0.95 mg KOH/g and the hydroxyl content is 1.37%.

Hydroxyester C

A mixture of 1635 parts of a commercially available straight chain primary fatty alcohol containing 6.9% hydroxy groups, 1775 parts of a commercial grade of 12-hydroxystearic acid and 5.5 parts of tetrabutyl titanate is heated for 6 hours at 190° to 200° C., the water formed in the reaction being removed in a stream of nitrogen. On cooling a wax is obtained. This has an acid value of 0.15 mg KOH/g and the hydroxyl content is 2.88%.

Hydroxyester D

A mixture of 810 parts of a commercially available straight chain primary fatty alcohol containing 6.9% hydroxy groups, 690 parts of a commercial grade of 12-hydroxystearic acid and 2.5 parts of tetrabutyltitanate is heated for 6 hours at 190° C. to 200° C., the water formed being removed in a stream of nitrogen. The resulting waxy solid has an acid value of 0.2 mg KOH/g and a hydroxyl content of 3.26%.

Hydroxyamide E

A mixture of 462 parts of a commerical grade of 12-hydroxystearic acid, 585 parts of dilaurylamine which is commerically available as Armeen 2C (RTM of Armour Hess Chemical Ltd.) and 65 parts of toluene is stirred for 19 hours at 190° to 200° C. under an atmosphere of nitrogen, the water formed in the reaction being separated from the toluene in the distillate which is then returned to the reaction medium. The toluene is then removed by distillation. The product is a viscous liquid at 50° C. which partially solidifies on further cooling. The acid value is 2.8 mg KOH/g and the infrared spectrum shows a band at 1645 cm$^{-1}$ due to the presence of an amide group.

Hydroxyester F

A mixture of 225 parts of a carboxyl terminated polyester obtained by heating a commercial grade of 12-hydroxystearic acid at 190° to 200° C. in the presence of tetrabutyl titanate until the acid value is 26.6 mg/KOH/g, 0.5 part of dodecyldimethylamine and 11.8 parts of epichlorohydrin is stirred at 150° to 155° C. for 3 hours. The acid value of the resulting product is zero and the product is virtually free from unreacted epichlorohydrin.

Aminoamido Polyester G

A mixture of 3 parts of a carboxyl terminated polyester prepared by heating a commercial grade of 12-hydroxystearic acid at 190° C. to 200° C. in the presence of 0.19% of tetrabutyl titanate until the acid value is 35.0 mg KOH/g and 1 part of a fatty diamine of the formula RNH (CH$_2$)$_3$NH$_2$ wherein R is a fatty radical derived from tallow (which) is commercially available as Duomeen T, RTM) is stirred for 6 hours at 160° C. in a stream of nitrogen. The resulting waxy product has an equivalent of 1455 when titrated with perchloric acid, and infra-red spectrum shows bands at 3310, 1645 and 1550 cm$^{-1}$ due to the CONH groups.

EXAMPLE 1

A mixture of 30.4 parts of tolylene diisocyanate, 0.006 part of benzoyl chloride, and 0.7 part of a petroleum fraction is stirred at 55° C. whilst an intimate mixture of 51.8 parts of Hydroxyester A and 0.2 part of acetylacetone is added. The temperature is raised to 110° C. and maintained for 1 hour. (At this stage the isocyanate content of the mixture is 11.7% NCO groups). The mixture is cooled to 50° C., 40 parts of acetone, 15.3 parts of 1:6-hexanediol and 0.1 part of diazabicyloooctane are added and the mixture stirred for 1 hour at the boil under a reflux condenser. 0.8 Part of methanol is added and the mixture stirred at the boil under reflux for a further 2 hours. 22 Parts of a petroleum fraction are added, and the mixture is then distilled whilst keeping the volume constant by addition of further amounts of the petroleum fraction until the temperature of the vapour reaches 101° C. The residue is then diluted with the petroleum fraction giving a 49.4% solution of the product.

The infra-red spectrum shows the presence of bands at 3320, 1730, 1530, 1230 and 1070 cm$^{-1}$ due to the presence of urethane group.

EXAMPLE 2

The procedure of Example 1 is repeated except that the usage of 1:6-hexanediol is reduced to 13.65 parts, this being equivalent to the isocyanate groups present at the end of the first stage. A 48.3% solution of the product in the petroleum fraction is obtained.

EXAMPLE 3

Example 1 is repeated except that the following quantities of reactants are used:

18.2 parts of tolylene diisocyanate
0.006 part of benzoyl chloride
64.6 parts of Hydroxyester B
1.08 parts of acetylacetone
40 parts of acetone
9.2 parts of 1:6-hexanediol
0.1 part of diazabicyclooctane
0.8 part of methanol A 57.8% solution of the product in the petroleum fraction is obtained.

EXAMPLE 4

In place of the 15.3 parts of 1:6-hexanediol used in Example 1 there are used 22.5 parts of 1:10-decanediol. A 55.5% solution of the product in the petroleum fraction is obtained.

EXAMPLE 5

The procedure of Example 1 is repeated except that 69.03 parts (instead of 51.8 parts) of Hydroxyester A are used, 0.27 part (instead of 0.2 part) of acetylacetone, and 13.6 parts (instead of 15.3 parts) of 1:6-hexanediol. A 53.8% solution of the adduct is obtained.

EXAMPLE 6

51.8 Parts of Hydroxyester C are gradually added to 30.4 parts of tolylenediisocyanate at 55° C., and the mixture is then stirred for 1 hour at 110° C. The mixture is cooled to 50° C., and a solution of 17.4 parts of dipropylene glycol in 59 parts of acetone added followed by a solution of 0.5 part of diazabicyclooctane in 9.9 parts of acetone. The mixture is stirred for 30 minutes at 55° C., and the mixture is then distilled until the temperature of the vapour reaches 101° C. whilst maintaining the volume constant by addition of the petroleum fraction. The mixture is then diluted with the petroleum fraction to give a 37.7% solution of the product.

The procedure of Example 6 is repeated except that the 17.4 parts of dipropyleneglycol are replaced by the following:

(a) 13.8 parts of diethyleneglycol
(b) 25.9 parts of polyethyleneglycol of M.W. 200
(c) 36.9 parts of an adduct of two molecular proportions of ethylene glycol with one molecular proportion of a fatty primary amine derived from coconut oil, which is commercially available as Ethomeen C/12 (RTM).
(d) 11.66 parts of 1:4- butanediol
(e) 11.66 parts of 1:3- butanediol
(f) 13.5 parts of 1:5- pentanediol
(g) 15.3 parts of 1:6- hexanediol

EXAMPLE 7

A mixture of 12.15 parts of tolylenediisocyanate and 32.7 parts of Hydroxyester D is stirred for 1 hour at 110° C. The mixture is cooled to 50° and, 4.1 parts of triethanolamine, 55 parts of acetone and 0.2 part of diazabicyclooctane are added, and the mixture is then heated for 30 minutes at 55° C. The solvent (acetone) is then replaced as described in Example 6. A 53.0% solution of the product in the petroleum fraction is obtained.

A similar product is obtained when the 4.1 parts of triethanolamine are replaced by 5.3 parts of triisopropanolamine.

EXAMPLE 8

A mixture of 30.4 parts of tolylenediisocyanate and 41.0 parts of Hydroxyester D is stirred for 1 hour at 110° C. The mixture is cooled to 50° C., 8.7 parts of ethyleneglycol, 48 parts of acetone and 0.5 part of diazabicyclooctane are added, and the mixture stirred for 30 minutes at 55° C. The solvent is then replaced as described in Example 6. A 47.5% solution of the product in the petroleum fraction is obtained

EXAMPLE 9

A mixture of 30.4 parts of tolylene diisocyanate and 51.8 parts of Hydroxyester C is stirred for 1 hour at 110° C. The mixture is cooled to 50° C. and a warm solution of 48.3 parts of Duomeen T in 195 parts of the petroleum fraction is added when the temperature of the mixture rises to 90° C. The resulting solution contains 40% of the product.

EXAMPLE 10

A mixture of 12.15 parts of tolylenediisocyanate and 41.5 parts of Hydroxyester C is stirred for 1 hour at 110° C. then cooled to 50° C. 32 Parts of acetone and 3.08 parts of trimethylolpropane are added and the mixture stirred at the boil under a reflux condenser for 1 hour. The acetone is then replaced as described in Example 6. A 59.7% solution of the product in the petroleum fraction is obtained.

EXAMPLE 11

A mixture of 30.4 parts of tolylene diisocyanate, 67.5 parts of Hydroxyamide E, 0.006 part of benzoyl chloride and 0.7 part of the petroleum fraction is stirred for 1 hour at 110° C. The mixture is cooled to 50° C., 40 parts of acetone, 15.4 parts cf 1:6- hexanediol and 0.1 part of diazabicyclooctane are added and the mixture stirred at the boil under a reflux condenser for 1 hour. 0.8 Part of methanol is added and the mixture stirred at the boil under reflux for a further 2 hours. 22 Parts of the petroleum fraction are added and the mixture distilled as described in Example 6. A 58.1% solution of the product is obtained.

EXAMPLE 12

A solution of 14.8 parts of Hydroxyester F in 20 parts of methylethyl ketone and 0.01 part of diazabicyclooctane are added to a mixture of 5.6 parts of methylethylketone and 2 parts of a commercially available 75% solution in ethylacetate of an adduct from tolylenediisocyanate, glycerol and diethyleneglycol containing 14.1% isocyanate groups, and the resulting mixture is stirred at the boil for 16 hours under reflux. The solvent is then distilled off leaving the product as a viscous liquid. The infra-red spectrum has bands at 3300, 1540, 1235 and 1070 cm$^{-1}$ due to the presence of urethane groups.

EXAMPLE 13

A mixture of 29.8 parts of a commercially available 75% solution in ethylacetate of a tolylene diisocyanate/glycerol/diethyleneglycol adduct contining 14.1% isocyanate groups, 40 parts of acetone and 59.2 parts of Hydroxyester D is stirred at 55° C. until a clear solution is obtained. A solution of 0.7 part of diazabicyclooctane in 5.6 parts of acetone is added and the acetone is then removed by distillation whilst the petroleum fraction is added to maintain a constant volume. The resulting solution is then diluted with more of the petroleum fraction to 21.4% strength.

EXAMPLE 14

In place of the 30.4 parts of tolylene diisocyanate used in Example 1 there are used 43.7 parts of 4:4'-diisocyanatodiphenylmethane. A 39.0% solution of the adduct is obtained.

EXAMPLE 15

A solution of 50.7 parts of Aminoamidopolyester G and 6.3 parts of 1:6- hexanediol in 93 parts of acetone at 45° C. is added to 12.15 parts of tolylene diisocyanate followed by 0.1 part of diazabicyclooctane in 4 parts of acetone. The mixture is stirred for 2 hours at the boil under reflux, 22 parts of the petroleum fraction are added and distillation are dilution are then carried out as described in Example 1. A 38.3% solution of the product in the petroleum fraction is obtained.

EXAMPLE 16

A mixture of 30.4 parts of tolylene diisocyanate, 51.8 parts of Hydroxyester A and 0.2 part of acetylacetone is stirred for 1 hour at 110° C. The mixture is cooled to 50° c., 40 parts of acetone, 15.3 parts of 1:6- hexanediol and 0.1 part of diazabicyclooctane are added, and the mixture stirred for 1 hour at the boil under reflux. 0.8 Part of methanol is added and the mixture boiled under reflux for a further 2 hours. The mixture is cooled and diluted with acetone giving a 50% solution of the product.

EXAMPLE 17

A mixture of 33.6 parts of isophorone diisocyanate, 46.6 parts of Hydroxyester A and 0.16 part of acetylacetone is stirred for 1 hour at 110° C. (The product then contains 11.35% of free NCO groups). To 61.7 parts of this mixture are added 40 parts of acetone, 11 parts of 1:6-hexanediol and 0.1 part of diazabicyclooctane, and the mixture is stirred for 16 hours at the boil under reflux. 22 Parts of the petroleum fraction are added and the mixture distilled as described in Example 1. A 52.9% solution of the product is obtained.

EXAMPLE 18

A mixture of 26 parts of hexamethylene diisocyanate, 46.5 parts of Hydroxyester A and 0.16 part of acetylacetone is stirred for 1 hour at 110° C. The mixture is cooled to 75° C., 109 parts of the petroleum fraction added, the mixture cooled to 50° C. then added to a solution of 43 parts of Duomeen T in 64.6 parts of the petroleum fraction at 50° C. The temperature rises to 78° C. and is maintained for 10 minutes. A 40% solution of the product is obtained.

We claim:

1. A dispersant formed by by reacting a polymethylene glycol having from 5 to 10 carbon atoms and an ester of the formula $$Z-X-E-(T-D)_{n-1}-Q$$

wherein
Z is

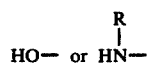

wherein R is alkyl
X is alkylene or a halogeno derivative thereof
T is alkylene
n is an integer from 1 to 8
Q is alkyl or hydroxyalkyl
and E and D are

provided that only one of E and D is connected to T via the carbon atom of the carbonyl group present in E or D and at least one of the groups represented by X, T, Q and R contains a carbon chain having more than four carbon atoms,
simultaneously or consecutively with an organic diisocyanate selected from hexamethylene diisocyanate, isophorone diisocyanate, 4,4'-diisocyanato-diphenylamine, 2:4-diisocyanatotoluene and 2:6-diisocyanatotoluene in the presence of an inert organic solvent at a temperature up to the boiling point of the reaction medium.

2. A dispersant according to claim 1 formed by reacting an 80:20 mixture of 2:4 and 2:6 diisocyanatotoluene, 1:6 hexanediol and a compound of the formula

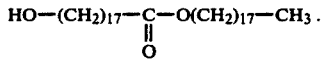

3. A dispersant according to claim 1 wherein the polymethylene glycol is 1:6-hexane diol.

4. A dispersant according to claim 1 wherein the organic diisocyanate is an 80:20 mixture of 2:4 and 2:6-diisocyanatotoluene.

5. A dispersant according to claim 1 wherein R contains from 8 to 18 carbon atoms and Q contains from 12 to 18 carbon atoms.

6. A dispersant according to claim 1 wherein n is 1.

* * * * *